United States Patent
Ringwald (10) Patent No.: US 12,265,155 B2
(45) Date of Patent: Apr. 1, 2025

(54) OPTOELECTRONIC SENSOR AND METHOD FOR DETECTING AN OBJECT IN ACCORDANCE WITH THE PRINCIPLE OF TRIANGULATION

(71) Applicant: SICK AG, Waldkirch (DE)

(72) Inventor: Siegfried Ringwald, Waldkirch (DE)

(73) Assignee: SICK AG, Waldkirch (DE)

( * ) Notice: Subject to any disclaimer, the term of this patent is extended or adjusted under 35 U.S.C. 154(b) by 331 days.

(21) Appl. No.: 17/872,614

(22) Filed: Jul. 25, 2022

(65) Prior Publication Data
US 2023/0032609 A1   Feb. 2, 2023

(30) Foreign Application Priority Data
Jul. 27, 2021   (DE) .......................... 102021119423.7

(51) Int. Cl.
*G01S 17/48*   (2006.01)
*G01S 7/481*   (2006.01)

(52) U.S. Cl.
CPC ............. *G01S 17/48* (2013.01); *G01S 7/4811* (2013.01)

(58) Field of Classification Search
None
See application file for complete search history.

(56) References Cited

U.S. PATENT DOCUMENTS

| | | | |
|---|---|---|---|
| 10,761,193 B2* | 9/2020 | Hörsch | G01S 17/04 |
| 2020/0284883 A1* | 9/2020 | Ferreira | H04N 25/773 |
| 2021/0066893 A1* | 3/2021 | Jang | G01S 7/4815 |
| 2021/0239995 A1* | 8/2021 | Lundeen | G02B 27/0938 |

FOREIGN PATENT DOCUMENTS

| | | |
|---|---|---|
| DE | 19962701 A1 | 6/2001 |
| DE | 10220037 B4 | 3/2006 |
| DE | 19721105 C5 | 7/2008 |
| DE | 102008014912 A1 | 9/2009 |
| DE | 10220037 C5 | 2/2011 |
| DE | 202014103068 U1 | 11/2015 |

(Continued)

OTHER PUBLICATIONS

Reshef, Orad et al., An optic to replace space and its application towards ultra-thin imaging systems, arXive:2002.06791v2 [physics.optics] Jun. 11, 2021Nat Commun 12, 3512 (2021), https://doi.org/10.1038/s41467-021-23358-8.

(Continued)

*Primary Examiner* — Luke D Ratcliffe
(74) *Attorney, Agent, or Firm* — Nath, Goldberg & Meyer; Jerald L. Meyer (57) ABSTRACT

An optoelectronic sensor in accordance with the principle of triangulation for detecting an object in a monitored zone is provided that has a light transmitter and a transmission optics associated with the light transmitter in a transmission path for transmitting a light beam, and a spatially resolving light receiver and a reception optics associated with the light receiver in a reception path for receiving the light beam remitted by the object, as well as a control and evaluation unit that is configured to evaluate a received signal of the light receiver. The sensor furthermore has an optical metaelement having a metasurface and/or a metamaterial in the reception path.

17 Claims, 4 Drawing Sheets

(56) References Cited

FOREIGN PATENT DOCUMENTS

| DE | 102015119668 B3 | 3/2017 |
|---|---|---|
| EP | 3002609 B1 | 9/2015 |
| EP | 3860107 A1 | 8/2021 |

OTHER PUBLICATIONS

Kim, et al., "Nanophotonics for light detection and ranging technology", Nature Nanotechnology, vol. 16, pp. 508-524, May 2021.
Office Action dated May 30, 2022 issued in corresponding German Application No. 102021119423.7.
Reshef, et al., "An optic to replace space and its application towards ultra-thin imaging systems", Nature Communications, https://doi.org/10.1038/s41467-021-23358-8.

\* cited by examiner

OPTOELECTRONIC SENSOR AND METHOD FOR DETECTING AN OBJECT IN ACCORDANCE WITH THE PRINCIPLE OF TRIANGULATION

FIELD

The invention relates to an optoelectronic sensor and to a method for detecting an object in a monitored zone in accordance with the principle of triangulation.

BACKGROUND

The principle of optical triangulation is based on arranging a light transmitter and a spatially resolving light receiver offset from one another by a known base distance. The transmission light beam and the reception light beam are then at an angle to one another, which has the result that the received light spot on the receiver migrates in dependence on the distance from the scanned object. The position of the received light spot on the spatially resolving light receiver is accordingly a measure for the object distance.

Measurement is by scanning in triangulation, that is the light is transmitted and received at substantially the same location except for the triangulation offset. Such sensors are therefore called light sensors or triangulation sensors. An alternative designation is a reflection light barrier, with the antonym thereof being a through beam sensor having a light receiver opposite the light transmitter with the monitoring path therebetween.

There are not only measuring triangulation sensors that determine and output a distance in the outlined manner, but also switching systems in accordance with the triangulation principle whose switching behavior depends on the object distance. These sensors include the background masking light sensors. They are switching, that is only output a binary object determination signal as corresponding switch states. At the same time, the design of a triangulation sensor is, however, utilized to generate two received signals using a light receiver spatially resolving at least into a near zone and a far zone. They are evaluated together, for example their difference is evaluated with a switching threshold in order thus to restrict the object detection to a specific distance zone and to suppress received signals from objects outside this distance zone as a background signal. A background masking light sensor is disclosed, for example, in DE 197 21 105 C2, with here additionally switches being provided to associate the individual elements of a spatially resolving light receiver with the near zone or far zone in a variable manner. DE 199 62 701 A1 describes a light sensor having a virtual separating web.

In triangulation, the angle information of the optical paths incident on the receiver lens is a decisive measure for the distance determination as this is translated into the evaluated distance-dependent position of incidence of the received light spot. The relationship between the object distance and the displacement of the received light spot on the light receiver is, however non-linear; the angle sensitivity reduces approximately quadratically as the object distance increases. Distance changes in the near zone result in large displacements of the received light spot; in the far zone, however, only in small displacements thereof. At the same time, the received light spot is not an ideal mathematical point and its extent is additionally again dependent on the object distance since the reception optics cannot sharply focus the total distance range. As a rule, a sharp image is only achieved from the far zone; the received light spot becomes increasingly more blurred and thus larger toward the near zone. Finally, the received light energy or the reception level also reduces approximately quadratically with the object distance. The measurement is therefore very sensitive in the near zone and very insensitive in the far zone. All this results in measurement inaccuracies and, in the case of background masking light sensors, in a switching point deviation and thus at least sometimes in defective switching. The sensitivity dynamics could possibly be processed by expensive components such as APDs (avalanche photodiodes) or SPADs (single photon APDs) having a correspondingly expensive switching technology and electronics. Despite the higher costs therewith, this would not remedy the other two unfavorable effects that still limit the measurement accuracy.

In addition to triangulation, time of flight measurement is also known for an optical distance measurement. The sensitivity and measurement accuracy are less dependent on the distance here. However, the triangulation would not be improved thereby, but replaced. For example, triangulation in no way loses its justification beside the time of flight measurement due to the problems described due to high accuracy in particular in the near zone, but also due to the completely different demands on the electronics and optics.

There are furthermore approaches in the prior art to improve the reception optics to improve the linearity of the triangulation, or to expand the measurement zone for particularly near objects. DE 102 20 037 C5, for example, uses an additional near zone lens that refracts the received light the greater in the direction of the light transmitter, the closer the object is. The near zone lens further increases the required construction space and only provides partial improvements in the near zone.

DE 10 2008 014 912 A1 arranges an additional corrective lens between the receiver lens and the light receiver. The light beam bundled by the receiver lens is thereby deflected in a targeted manner such that there is a greater spacing of the incident light beams on the light receiver and such that there is a sharp image. In fact, however, this is not possible at all with a corrective lens that influences the total optical reception path, but at most a partial improvement is achieved for a certain distance range.

DE 10 2015 119 668 B3 proposes a further-improved optical element between the light receiver and the reception optics that has an optimized free form design with a converging partial zone and a diverging partial zone. An improved correction is thus achieved. The improvements are, however, not yet sufficient for high demands on triangulation.

The paper by Reshef, Orad, et al. "An optic to replace space and its application towards ultra-thin imaging systems", Nature communications 12.1 (2021): 1-8 looks at so-called metalenses and spaceplates without any connection to optical triangulation. Metalenses are extremely thin optical elements having a lens effect that have special nanostructures to influence beam paths. Spaceplates in turn are directed with similar technologies to the region between the lenses since a plurality of metalenses also first have to observe a distance from one another like classical lenses. The spaceplates should reduce this distance to be able to further reduce the construction depth of an optics.

It is therefore the object of the invention to further improve optical triangulation.

SUMMARY

This object is satisfied by an optoelectronic sensor in accordance with the principle of triangulation to detect an object in a monitored zone and by a method of detecting an object in a monitored zone in accordance with the principle of triangulation in accordance with the respective independent claim. The sensor, preferably a light sensor in accordance with the principle of triangulation, has a transmission path in which a light transmitter transmits a light beam via a transmission optics and a reception path in which the light beam remitted at an object is detected by a reception optics in a light receiver. The remitted light beam can be produced both by diffuse remission and by directed reflection. The transmission path and the reception path are offset from one another by a base distance, preferably measured at a distance between the optical axes of the reception optics and the transmission optics.

The position of incidence of the received light spot that the remitted light beam produces on the light receiver is dependent on the distance, also called the detection range, of the object on the basis of the base distance or on the triangulation base and the object distance can therefore be triangulated. The light receiver has a spatial resolution in the direction of the distance-dependent change of the position of incidence, is, for example, set up as a receiver array having at least two light reception elements or as a matrix of light reception elements of which then possibly one or more rows are selected and used in the matching direction.

A received signal of the light receiver is evaluated. The aim of this evaluation differs in dependence on the embodiment. An object distance can be measured using the position of incidence of the received light spot. The evaluation can only determine whether an object has been detected at all or a certain distance zone is fixed with reference to the position of incidence and whether an object is detected in this distance zone is evaluated.

The invention starts from the basic idea of providing an optical metaelement in the reception path. The metaelement acts differently on the remitted light beam in dependence on the embodiment and replaces and/or supplements the reception optics. The metaelement for this purpose has a metasurface and/or a metalmaterial, i.e. nanostructures, that form certain wavefronts of the remitted light beam in a very targeted manner. Such nanostructures are provided at the surface with a metasurface; a metamaterial achieves corresponding properties through the nanostructure of a layer system or of a solid body.

The invention has the advantage that the initially described disadvantages of a triangulation sensor can be considerably improved. This relates to a plurality of sensor properties that are addressed in part or in full. The position of incidence can be defined more distinctly over a large distance zone and can be determined more exactly due to an improved reception optics. This results in an improvement of the measurement accuracy and the sensitivity over the near and far zones. With switching systems such as background masking light sensors, this allows a more precisely observed switching point and prevents erroneous switching. A corresponding construction space would in particular be required for a higher sensitivity in the far zone with a conventional lens with a then larger focal length and a further miniaturization is only possible by the metaelement used in accordance with the invention.

The optical element preferably has a metalens. In this respect, a metasurface is arranged at the front and/or rear sides on a flat, light-permeable carrier material. The nanostructure of the metasurface is configured such that the remitted light beam is shaped under designed lens properties. A metalens can have a metamaterial instead of a simple carrier material.

The optical metaelement preferably has a spaceplate. A spaceplate is an example of a metamaterial, with it not primarily being applied to a change of the wavefront corresponding to a lens effect. A longer optical path should rather so-to-say be implemented in a smaller physical space to be able to arrange optical elements, in particular metalenses, closer to one another. A spaceplate or another metamaterial can be provided with a metasurface at the front and/or rear sides to combine the effects of a spaceplate and of a metalens. Reference is additionally made to the paper named in the introduction of Reshef et al. for further details on spaceplates.

The optical metaelement preferably has at least partly the function of the reception optics. This function is preferably to guide the remitted light beam to the light receiver, and indeed such that a received light spot is produced at a position on the light receiver corresponding to the object distance in accordance with the triangulation principle. At least partly can be understood in a double sense: there can both be further optical elements of the reception optics and the metaelement can take over further functions beyond those of the reception optics. The reception optics is preferably completely replaced, that is no further optical elements such as lenses and the like of the reception optics are required.

The sensor preferably has an optical corrective element in the reception path that at least partly homogenizes a triangulation effect, in particular a position of incidence of a received light spot on the light receiver, a received light spot size, and/or a reception level, in each case in dependence on the distance of the object. The triangulation effect on which triangulation is based, is the position of incidence on the light receiver varying with the object distance. As already briefly outlined in the introduction, this is, however, not as beneficent over the total distance measurement range, such as would be desired for a highly accurate measurement. The optical corrective element serves the purpose of at least coming closer to such an ideal situation. At least three interference effects to be homogenized can be named for this purpose. First, the position of incidence in the near zone varies a great deal, but hardly at all in the far zone with changes of the object distance. Homogenize here means giving up measuring sensitivity in the near zone in favor of the far zone, with a linearization representing the ideal to be aimed for, albeit not achievable in practice. Second, the diameter of the received light spot produced by the remitted light beam changes with the object distance. A punctiform or very sharply imaged received light spot is only produced for a certain distance zone, typically the far zone or an object at infinity. In the near zone, the received light spot becomes increasingly larger, is thereby more difficult to localize, and also outdazzles the light receiver. The optical corrective element should here provide an at least sharper image, ideally a received light spot that is punctiform or at least equal in size overall. Third, the reception level in the near zone is distorted and too low in the far zone. A reception level that is the same everywhere would be the aim here. The optical corrective element can, for example, pull the received light spot further transversely to the direction of its distance dependent migratory movement as the object distance decreases. In the near zone, an increasing portion thus misses the light receiver, which provides a smaller reception level. The optical corrective element homogenizes the triangulation effect with respect to at least one of these interference effects. As will be seen for the first time at once and multiple times in the following, the optical corrective element does not have to be a separate additional component in accordance with the invention.

The optical metaelement preferably has at least partly the function of the optical corrective element. The just explained homogenization of the triangulation effect then does not place by a refractive corrective lens or the like, but rather by the optical metaelement. At least partly again has the possible double meaning that there can be further optical elements for a homogenization of the triangulation effect and/or that the optical metaelement can take over further functions in addition to a homogenization of the triangulation effect. The optical metaelement, however, preferably performs the function of the optical corrective element on its own.

The optical metaelement preferably has a focal length that varies with the angle of incidence, in particular monotonically. The nanostructures of the optical metaelement are sensibly not described structurally, but functionally. In practice, it is not a question of which specific nanostructure is provided, but rather that the desired optical properties are achieved. There are also the most varied different implementation possibilities here, that is nanostructures, that equally satisfy a desired optical effect. The angle of incidence corresponds to the object distance due to the triangulation arrangement of the transmission and reception path. A classical lens would only have a uniform focal length for the incident remitted light beam, which then, however, produces the discussed interference effects and non-linearities. A focal length varying with the angle of incidence thus provides a desired homogenization of a triangulation effect. The focal length preferably depends monotonically on the angle of incidence so that a greater focal length acts on the remitted light beam with a steeper angle of incidence or vice versa. The direction of increasing or decreasing focal length of this preferably monotonic relationship depends on the design of the sensor. Such a variable focal length can specifically correct the position of incidence by a greater or lesser deflection, in accordance with the interference effect discussed above under first, and to refocus in accordance with the interference effect discussed above under second to limit the diameter of the received light spot. In accordance with the interference effect discussed under third, an elliptical effect dependent on the angle of interference would further be conceivable that pulls the received light spot differently greatly in the transverse direction.

The optical metaelement preferably focuses the remitted light beam in the light receiver plane for all the angles of incidence occurring over a range of the sensor. The metaelement thus takes over a possible function of the optical corrective element. The design demand on the construction of the nanostructures of the optical metaelement here is that a sharp image in the light receiver plane is achieved for all the angles of incidence that correspond to the object distance in the triangulation arrangement. This can in particular be achieved with a focal length that depends on the angle of incidence. All the angles of incidence here means that angle range that corresponds to object distances in a measurement zone or within a range of the sensor.

The metaelement preferably has a first part element for an at least partial linearization of the dependence of the position of incidence on a distance of the object and a second part element for an at least partial homogenization of a received light spot size at different distances of the object. The two homogenizations of an optical corrective element discussed above under first and second are distributed over two part elements here. The first part element provides an at least rather linear distance dependence of the triangulation offset on the light receiver, the second part element provides a focusing that is as independent of the distance as possible.

The optical metaelement preferably has at least partly the function of both the reception optics and the optical corrective element. The optical metaelement thus generates the received light spot on the light receiver in the function of the reception optics and simultaneously provides an optical correction to relieve at least one of the above-named interference effects by homogenization. At least partly here also has the double sense that the reception optics and/or optical corrective element can have further optical elements and that the optical metaelement can cover even more functions. The optical metaelement is particularly preferably a reception optics and an optical corrective element in one; there are then no further optical elements in the reception path.

The transmission optics preferably has a second optical meta element. In this embodiment, an optical metaelement that replaces or supplements a, for example, refractive conventional transmission optics, is also provided in the transmission path. An optical corrective element is not required in the transmission path, the triangulation effect occurs at the reception side. The function of the transmission optics is the generation of a delineated light beam, for example by collimation. Alternatively to an embodiment with a second optical metaelement, the transmission path can nevertheless have a refractive transmission lens or the like. The optical metaelement and the second optical metaelement are particularly preferably configured as a common metaelement. The common metaelement can then represent the total optics and can simultaneously act as a transmission optics, a reception optics, and an optical corrective element. Alternatively, supplementary additional optical elements are conceivable.

The sensor is preferably configured as a background masking light sensor in which the light receiver has a near zone and a far zone with a separating web therebetween and that in particular has a switch output whose switching state depends on whether an object is detected in the near zone or whether an object is detected in the far zone. The functional principle of a background masking light sensor was briefly explained in the introduction. Background masking means that objects are only detected in a certain distance zone and are ignored outside this distance zone, with the working zone of interest typically being the near zone, but can also be the far zone or another distance zone. Which signals are masked as background depends on the location of the separating web. The separating web can be the physical separating line between a near and a far reception element. A virtual separating web is frequently meant that is electronically adjustable in that individual light receivers are connected by a simple or weighted interconnection with the near and far elements. A displacement of the separating web with a subpixel resolution is even possible by such weightings.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in.

BRIEF DESCRIPTION OF THE DRAWINGS

Detailed Description

Figure 1:
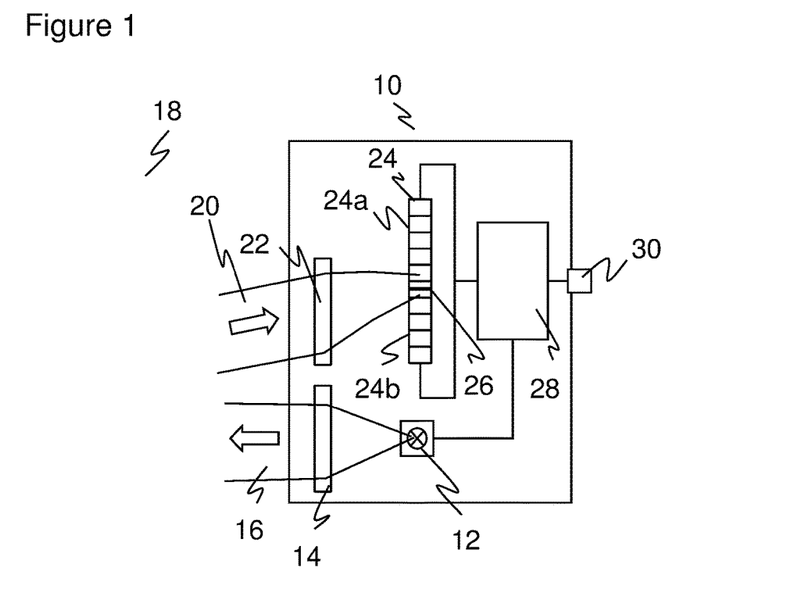
FIG. 1 a block diagram of an optoelectronic sensor in accordance with the triangulation principle.

FIG. 1 shows a schematic sectional illustration of an optoelectronic sensor 10 in accordance with the triangulation principle that is configured here by way of example as a background masking light sensor. A light transmitter 12 transmits a light beam 16 into a monitored zone 18 via a beam-shaping transmission optics 14. If the light beam 16 is incident onto an object in the monitored zone 18, a portion thereof travels back to the sensor 10 as a remitted light beam 20. The remitted light beam 20 is guided by a reception optics 22 onto a light receiver 24 that generates an electrical received signal therefrom. The transmission optics 14 and reception optics 22 are shown purely schematically as boxes to initially leave their specific structure open. In accordance with the invention, they are implemented at least in part by an optical metaelement, as will be explained later.

A background masking has been provided in the embodiment of the sensor 10 shown. The light receiver 24 is therefore divided into a near zone element 24a and a far zone element 24b. A separating web 26 that divides the individual light reception elements or pixels of the light receiver 24 into two groups and thus the light receiver 24 into the near and far zone elements 24a-b is defined for the background masking by a works setting, parameterization, or teaching. The location of the separating web 25 can be electronically variable, and indeed also with subpixel accuracy.

The position of incidence of the remitted light beam 20 or of the received light spot produced thereby on the light receiver 24 depends, due to the triangulation arrangement in the sensor 10, on the distance of the scanned object at which the remitted light beam 20 is reflected back. The offset between the light transmitter 12 and the light transmitter 24 or of the transmission optics 14 and the reception optics 22 forms a triangulation base. This in particular has the result that the received light spot from a far object is registered on the far zone element 24b and from a near object on the near zone element 24a. The separating web 26 decides which objects are to be considered near objects or far objects.

An evaluation unit 28 is connected to the light receiver 24 to determine an object determination signal, that is output at a switch output 30, from the electrical received signals depending on the presence of an object in the near zone. The evaluation unit 28 forms the difference between the signals of the near zone element 24a and of the far zone element 24b and evaluates this difference with a threshold for the background masking, for example. A switch signal is accordingly generated at a switch output 30 that indicates an object determination when an object is detected in the near zone and no object determination when no object or only an object in the far zone to be masked is detected. The evaluation unit 28 additionally controls the light transmitter 12.

The light receiver 24 in FIG. 1 is a receiver array having a plurality of light reception elements or pixels that are arranged to form a row and that are grouped to form the near zone element 24a and the far zone element 24b. The spatial resolution does not necessarily have to be used only for a division into near and far zones. On the one hand, additional separating webs and distance zones are conceivable. In addition, the triangulation can be used for a distance measurement instead of for background masking; the sensor 10 is then a distance measuring triangulation sensor. The light receiver 24 can have an additional spatial resolution in the transverse direction; the triangulation effect occurs in the longitudinal direction shown, however.

Figure 2:
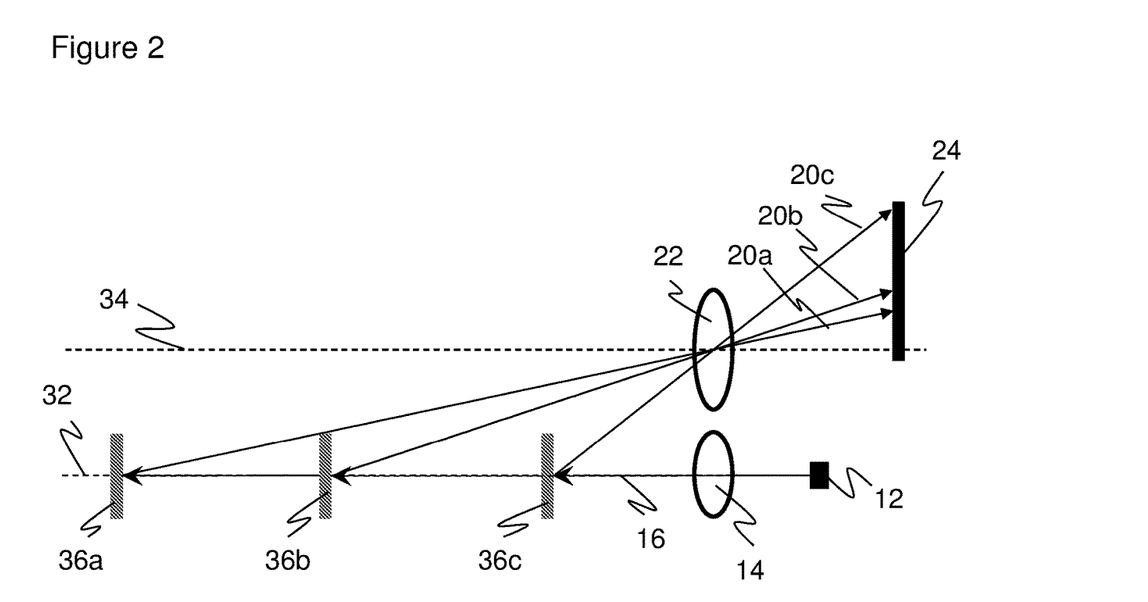
FIG. 2 a schematic diagram to explain the optical triangulation and the triangulation dynamics, i.e. the different sensitivity for distance changes in the near and far zones.

FIG. 2 shows a schematic diagram of the optical triangulation. The transmission optics 14 and the reception optics 22 are here still shown as refractive lenses to illustrate different distance-dependent interference effects or dynamics that are then improved in accordance with the invention by the already addressed optical metaelement that is still to be explained in more detail. The optical axis 32 at the transmission side and the optical axis 34 at the reception side are additionally drawn to illustrate the base distance for the triangulation.

The system sensitivity of an optoelectronic sensor 10 in accordance with the triangulation principle initially depends on various properties of the sensor 10 itself such as the light transmitter 14, focal lengths of the transmission optics 14 and reception optics 22, or on the base distance. It furthermore varies with the distance of the respective object. An object is shown at three different distances by way of example in FIG. 2, an object 36a in a far zone, an object 36b in an intermediate zone, and an object 36c in a near zone. What this means in absolute distances can differ greatly and is determined by the design of the sensor 10 and the distance measurement zone to be covered or the range. The remitted light beam 20a of the object 36a in the far zone, the remitted light beam 20b of the object 36b in the intermediate zone, and the remitted light beam 20c of the object 36c in the near zone is respectively incident on the light receiver 24 in a position of incidence that has a triangulation offset from which the object distance can be backcalculated with knowledge of the remaining geometry, in particular of the base distance This is again the fundamental triangulation principle.

The sensitivity, however, differs greatly depending on the object distance. The change of the triangulation offset on a change of the object distance is much more pronounced in the near zone than in the far zone. The triangulation offset corresponds with the angle of incidence on the reception optics 22. The triangulation sensitivity is non-linear; it decreases approximately quadratically. The same again applies to the reception level. A sensor 10 that is not compensated by the optical metaelement in accordance with the invention and that is adapted to a good system sensitivity in the intermediate zone thus has much too small a system sensitivity in the far zone and much too high a system sensitivity in the near zone.

Figure 3:
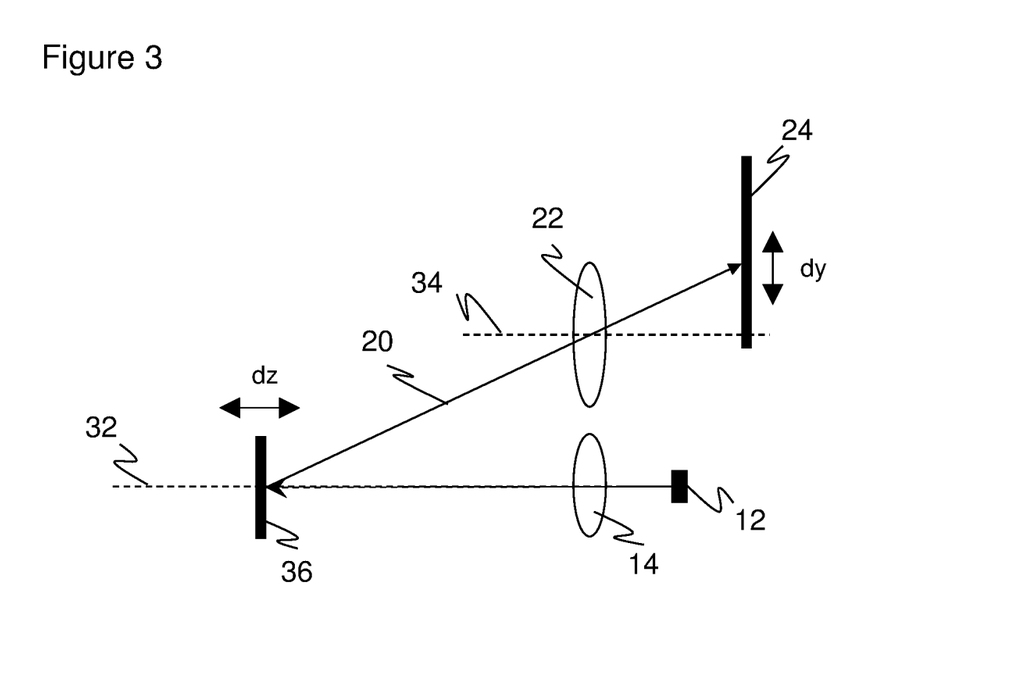
FIG. 3 a further schematic diagram to explain the triangulation dynamics.

FIG. 3 illustrates this triangulation sensitivity or triangulation dynamics a further time. If the distance of the object 36 marked by z varies by dz, the position of incidence of the received light spot on the light receiver 34 changes by dy in its longitudinal direction y. The greater the distance of the object 36 in the z direction, the smaller the triangulation effect or the variation dy is at the same distance change dz.

Figure 4:
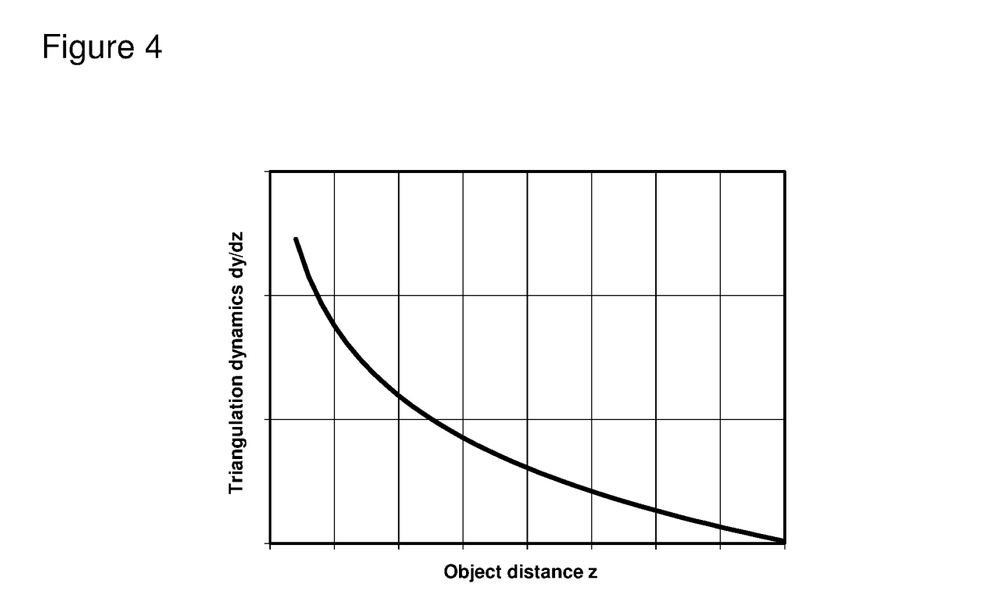
FIG. 4 a schematic representation of the triangulation dynamics in dependence on the object distance.

FIG. 4 illustrates this statement again in a diagram in which the triangulation dynamics dy/dz are entered in dependence on the object distance for an exemplary design of a sensor 10. The representation is logarithmic. The triangulation sensitivity is higher by orders of magnitude for close object distances z than for far object distances z and this can be at least partly linearized by the optical metaelement.

Figure 5:
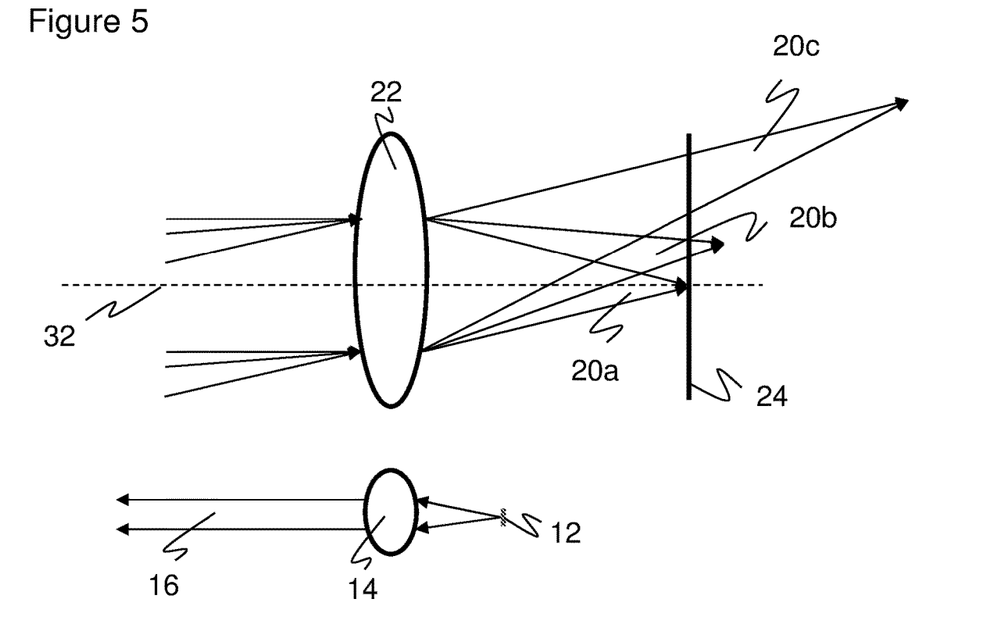
FIG. 5 a schematic diagram to explain the different received light spot size in dependence on the object distance.

FIG. 5 is a schematic diagram that illustrates a further unwanted effect of an uncorrected triangulation. The reception optics 22 is adapted here such that with a far object 36a or with a remitted light beam 20c from infinity a sharp image is achieved on the light receiver 24. The received light spot is accordingly sharply imaged and is in particular almost punctiform. In accordance with the imaging equation $1/f=1/g+1/b$, where f is the focal length, g the object width, and b the image distance, the images become blurred and the received light spots become very large for the remitted light beam 20b from an object 36b from the intermediate zone or even the remitted light beam 20c from an object 36c from the near zone. This can distort the position of incidence and in addition a portion of the light can be incident next to the light receiver 24 in the transverse direction and so cannot be detected.

Figure 6:
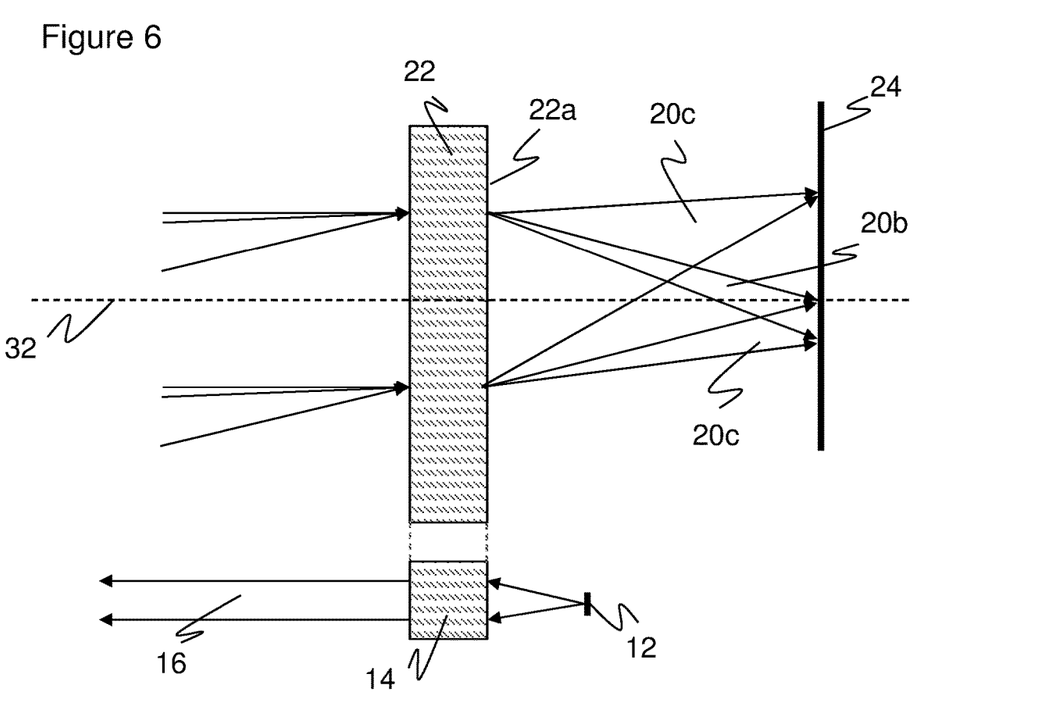
FIG. 6 a schematic representation of a triangulation arrangement with an optical metaelement in the reception path that corrects the triangulation dynamics and size of the received light spot.

FIG. 6 shows a schematic representation of a triangulation arrangement with an optical metaelement 22 in the reception path that corrects the triangulation dynamics and size of the received light spot. The optical metaelement 22 has the reference numeral of the reception optics of FIGS. 1 to 5 that it forms, replaces, or supplements in dependence on the embodiment. It preferably simultaneously satisfies said corrective functions. The optical metaelement or a further optical metaelement can equally form, replace or supplement the transmission optics 14 and is therefore provided with its reference numeral in its lower part. The design of the optical metaelement can be selected such that the light transmitter 12 and the light receiver 24 are arranged on a common expansion card.

The optical metaelement 22 has a metasurface 22a and is in particular structured as a metalens (flat optics). It is alternatively or additionally conceivable that the body or carrier of the optical metaelement 22 already has a metamaterial, in particular that the optical metaelement 22 is a spaceplate.

Conventional optical components such as lenses, waveplates, or holograms are based on light propagation over distances that are much larger than the wavelength of the light beam 16, 22 to form wavefronts. In this way, substantial changes of the amplitude, phase, or polarization of light waves are gradually accumulated along the optical path. A metasurface 22a in contrast has structures that can be understood as miniature anisotropic light scatterers or resonators or optical antennas. These structures have dimensions and distances in the nanometer range, much smaller than the wavelength of the light beam 16, 22. The metasurface 22a thereby shapes in accordance with the Huygens principle by optical wavefronts into any desired forms having sub-wavelength resolution in that the nanostructures introduce spatial variations in the optical response of the light scatterers. Effects of a conventional lens can thus be modeled, but also functionalities of other optical components such as beam splitters, polarizers, or diffraction grids. The special feature is the high flexibility of reaching a desired starting wavefront and thus the most varied optical effects through adapted nanostructures. Depending on the wavelength range, materials having a suitable transmission behavior are used, for example titanium dioxide, silicon nitride or gallium phosphide in the visible spectral range and aluminum nitride in the ultraviolet spectral range, and chalcogenide alloys in the medium and silicon in the longwave infrared range.

These considerations on a metasurface can be transferred to a metamaterial in which the interior or the carrier has corresponding nanostructures, with it being able to be combined with a metasurface. Spaceplates can thus be implemented that effectively compress a light path onto a smaller space for which purpose reference is again additionally made to the paper of Reshef et al. cited in the introduction. The optical metaelement 22 can consequently have a metastructure or nanostructure in the interior and/or on the front side and/or rear side.

The properties of the optical metaelement 22 are now preferably selected such that the focal length becomes a function of the angle of incidence. For this purpose, the metasurface 22a is correspondingly structured and/or a metamaterial is selected for the optical metaelement that is in particular configured as a spaceplate. The desired focal length dependence on the angle of incidence can be easily implemented with a spaceplate, for example by silicon layers or silicon oxide layers as an anisotropic element for focal length variation dependent on the angle of incidence.

The angle of incidence corresponds to the object distance, as previously shown. A further design demand can be that a focused imaging takes place in the receiver plane of the light receiver 24 for all the object distances. The result is at least lessened triangulation dynamics in which variations dz of the object distance also effect a greater variation dy of the position of incidence of the received light spot on the light receiver 24 with larger object distances z. In addition, focusing takes place on the light receiver 24 independently of the object distance; the variation of the received light spot with the object distance is omitted or is at least lessened.

Figure 7:
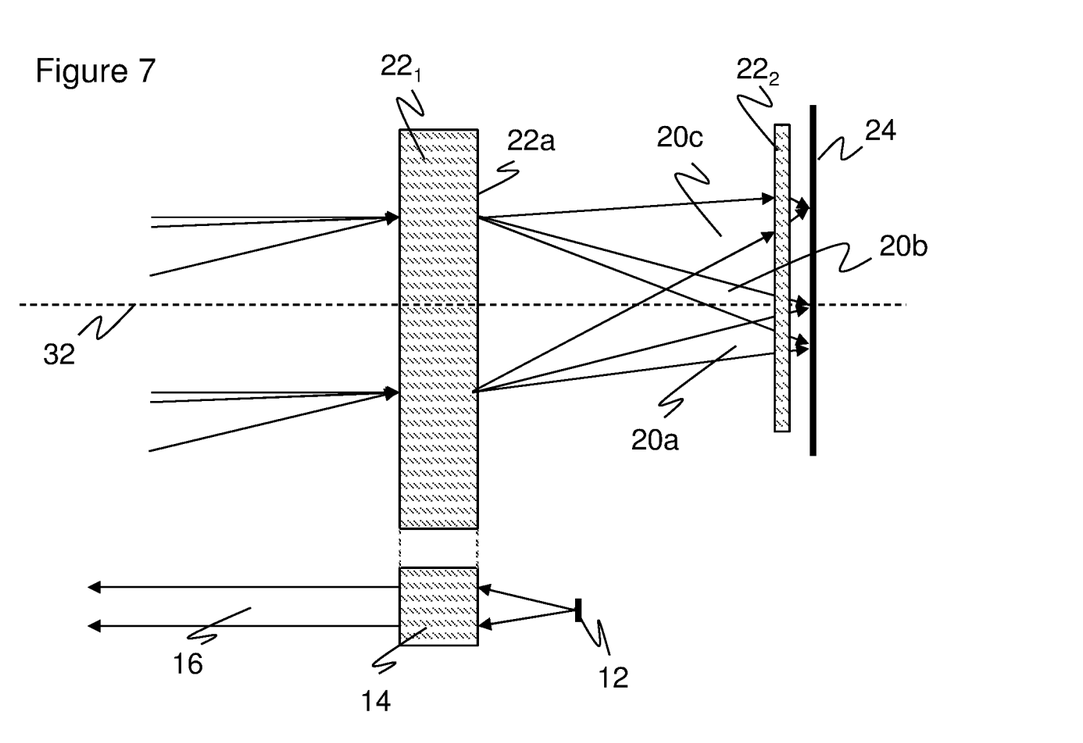
FIG. 7 a schematic representation similar to FIG. 6 in which the optical metaelement is divided into two part elements.

FIG. 7 shows a schematic representation similar to FIG. 6 in which the optical metaelement is divided into two part elements 221 and 222. Both part elements can comprise metamaterial and/or a metasurface 22a at the front side and/or rear side. The imaging and corrective functions can thus be distributed. In this example, the triangulation dynamics are performed by the first part element 221 and the focus adjustment by the second part element 222 with a spatially resolved transmission function. The different functions of the optical metaelement 22, whether as a metamaterial and/or metasurface, in particular a focal length adjustment dependent on the angle of incidence, can be split over two or more part elements in this way or in a comparable way. In this respect, functions can be separated and respectively assigned to a part element and/or the part elements can complement one another in satisfying the same function.

Figure 8:
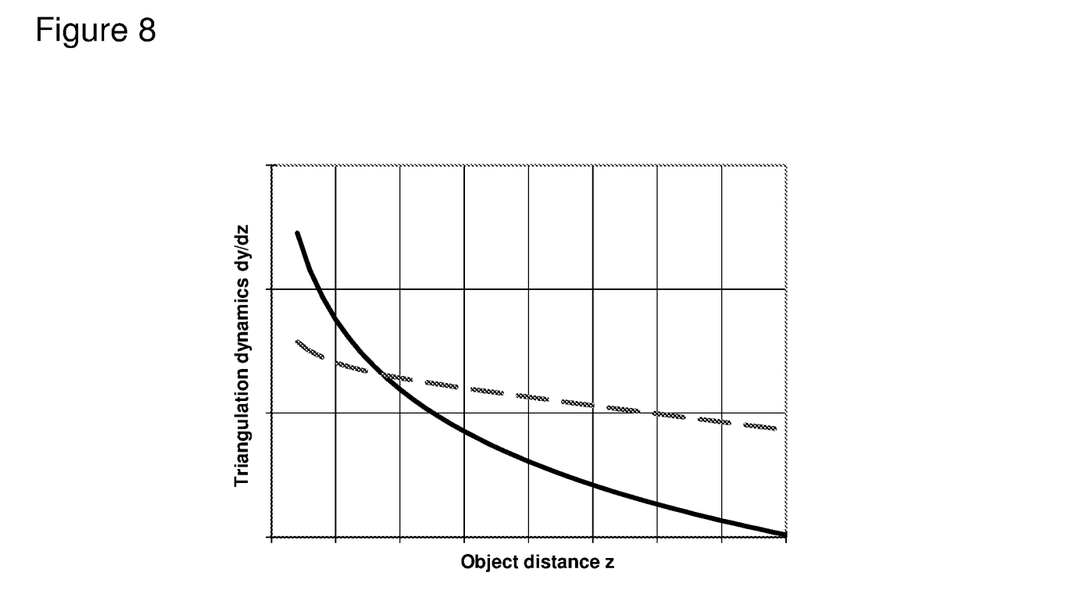
FIG. 8 a schematic representation in which the uncorrected triangulation dynamics in accordance with FIG. 4 are compared with the triangulation dynamics corrected by an optical metaelement.

FIG. 8 again shows the triangulation dynamics dy/dz in dependence on the distance object z. The solid line is a repetition of FIG. 4 for the uncorrected case, for example with a refractive reception optics 22 as a comparison. The dashed line is achieved by the use in accordance with the invention of an optical metaelement 22. A considerably greater sensitivity is achieved in the far zone and at the same time the otherwise unwanted high sensitivity is considerably reduced in the near zone. The theoretical ideal would be a flat, constant extent and the invention takes a very considerable step in this direction.

The invention claimed is:

1. An optoelectronic sensor in accordance with the principle of triangulation for detecting an object in a monitored zone that has a light transmitter and a transmission optics associated with the light transmitter in a transmission path for transmitting a light beam, and a spatially resolving light receiver and a reception optics associated with the light receiver in a reception path for receiving the light beam remitted by the object, as well as a control and evaluation unit that is configured to evaluate a received signal of the light receiver, that has an optical corrective element in the reception path that at least partly homogenizes a triangulation effect,     wherein the sensor has an optical metaelement having at least one of a metasurface and a metamaterial in the reception path,     wherein the optical metaelement has a focal length that varies with the angle of incidence and wherein the focal length varies monotonically.

2. The sensor in accordance with claim 1,
wherein the optical metaelement has a metalens.

3. The sensor in accordance with claim 1,
wherein the optical metaelement has a spaceplate.

4. The sensor in accordance with claim 1,
wherein the optical metaelement at least partly has the function of the reception optics.

5. The sensor in accordance with claim 1,
wherein the triangulation effect is at least one of a position of incidence of a received light spot on the light receiver, a received light spot size, and a reception level, in each case in dependence on the distance of the object.

6. The sensor in accordance with claim 1.
wherein the optical metaelement at least partly has the function of the optical corrective element.

7. The sensor in accordance with claim 1,
wherein the optical metaelement focuses the remitted light beam in the light receiver plane for all of the angles of incidence occurring over a range of the sensor.

8. The sensor in accordance with claim 1,
wherein the metaelement has a first part element for an at least partial linearization of the dependence of the position of incidence on a distance of the object and a second part element for an at least partial homogenization of a received light spot size at different distances of the object.

9. The sensor in accordance with claim 1,
wherein the optical metaelement at least partly has the function of both the reception optics and the optical corrective element.

10. The sensor in accordance with claim 1,
wherein the transmission optics has a second optical metaelement.

11. The sensor in accordance with claim 10,
wherein the optical metaelement and the second optical metaelement are configured as a common metaelement.

12. The sensor in accordance with claim 1,
that is configured as a background masking light sensor in which the light receiver has a near zone and a far zone with a separating web therebetween.

13. The sensor in accordance with claim 12,
further comprising a switch output having a switching state that depends on whether an object is detected in the near zone or whether an object is detected in the far zone.

14. A method of detecting an object in a monitored zone in accordance with the principle of triangulation, wherein a light beam is transmitted, the light beam remitted by the object offset by a base distance is received again, and a received signal is generated therefrom, and the received signal is evaluated,     wherein an optical corrective element in the reception path at least partly homogenizes a triangulation effect     wherein the remitted light beam is incident on an optical metaelement having a metasurface and/or a metamaterial,     and wherein the optical metaelement has a focal length that varies with the angle of incidence,     and wherein the focal length varies monotonically.

15. An optoelectronic sensor in accordance with the principle of triangulation for detecting an object in a monitored zone that has a light transmitter and a transmission optics associated with the light transmitter in a transmission path for transmitting a light beam, and a spatially resolving light receiver and a reception optics associated with the light receiver in a reception path for receiving the light beam remitted by the object, as well as a control and evaluation unit that is configured to evaluate a received signal of the light receiver, that has an optical corrective element in the reception path that at least partly homogenizes a triangulation effect,     wherein the metaelement has a first part element for an at least partial linearization of the dependence of the position of incidence on a distance of the object and a second part element for an at least partial homogenization of a received light spot size at different distances of the object.

16. The sensor in accordance with claim 15,
wherein the optical metaelement has a focal length that varies with the angle of incidence.

17. The sensor in accordance with claim 16,
wherein the focal length varies monotonically.

* * * * *